May 1, 1928.
G. A. JACOBS
HINGE
Filed March 12, 1926
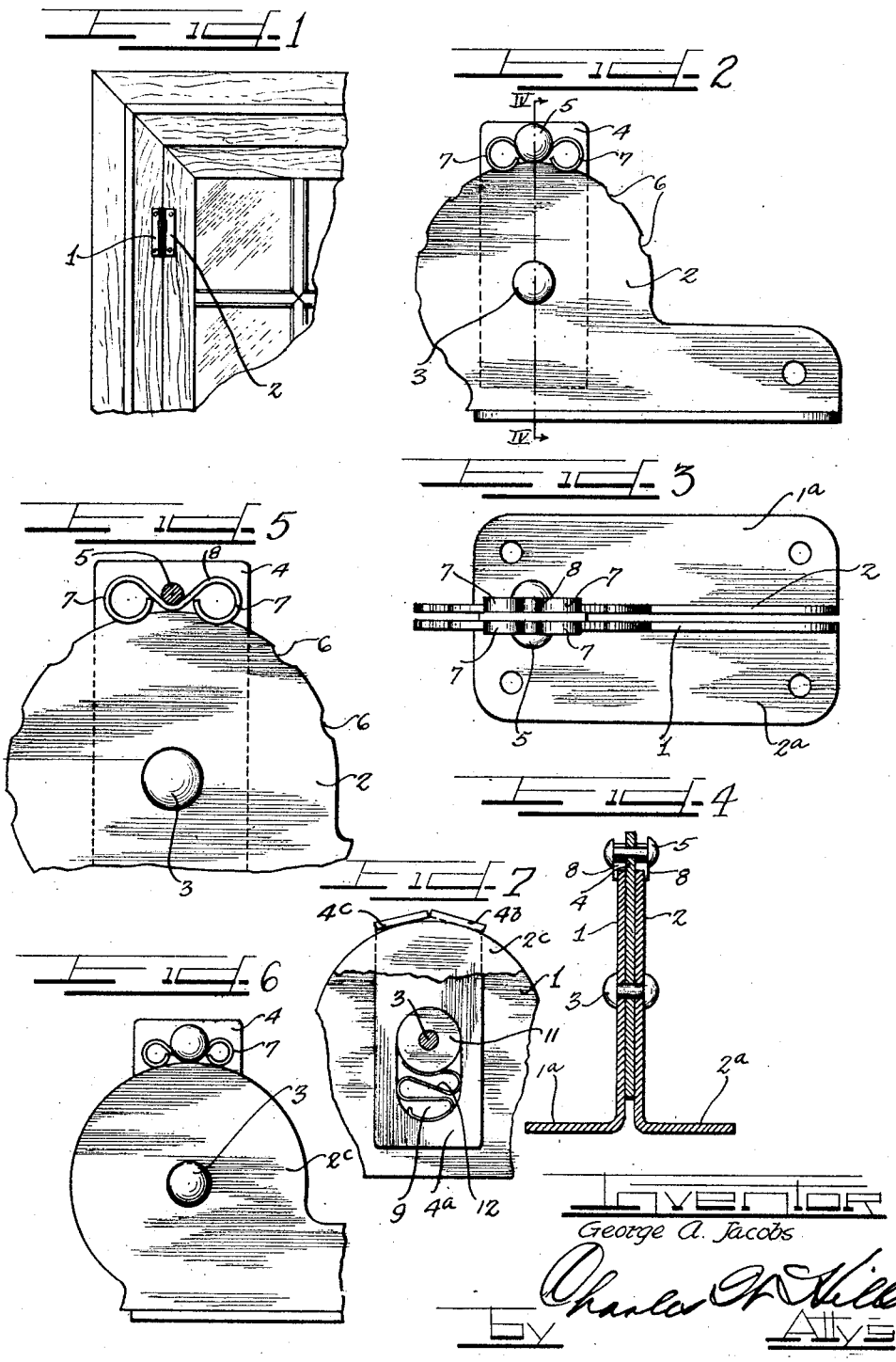

Patented May 1, 1928.

1,667,806

UNITED STATES PATENT OFFICE.

GEORGE A. JACOBS, OF CHICAGO, ILLINOIS.

HINGE.

Application filed March 12, 1926. Serial No. 94,109.

This invention relates to a hinge adapted for use in connection with windshields or ordinary swingable windows.

It is an object of this invention to provide a simple structure having means for yieldingly controlling the movable parts of the hinge that is simple, economical and can be readily manufactured.

With these and other objects in view, this invention comprises the novel structure and combinations hereinafter described and more particularly pointed out and defined in the appended claims.

In the accompanying drawings, which illustrate certain preferred embodiments of this invention and in which similar reference characters refer to similar features in the different views:

Figure 1 is a fragmentary elevational view of a window structure embodying my novel form of hinge;

Figure 2 is an enlarged elevational view of the hinge;

Figure 3 is an enlarged top plan view of the hinge;

Figure 4 is an enlarged sectional view upon the line IV—IV of Figure 2;

Figure 5 is an enlarged fragmentary elevational view of the hinge with parts shown in section;

Figure 6 is an enlarged fragmentary elevational view of the hinge in a slightly modified form; and Figure 7 is a part sectional and part elevational view of a slightly modified form of the invention.

In referring to the drawings, it will be observed that the hinge comprises a pair of relatively movable or rotatable members 1 and 2, the former of which may constitute the stationary disk member while the latter may form the movable member. These members are rotatably connected by a rivet 3. A plate or support 4 is positioned between the disk members 1 and 2 upon the same pivot 3. The upper end of this plate is provided with a double headed stud 5 which projects upon opposite sides of said plate. It will be noted that the peripheries of the members 1 and 2 are of substantially arcuate form at one end and the movable member 2 may be provided with suitable notches 6 upon such arcuate portion for cooperation with the loop terminals 7 of a resilient detent 8 which is in the form of a leaf spring confined between the rivet 5 and the periphery of the disk member 2 as shown in Fig. 5.

It will be noted that the resilient detent 8 has an intermediate indented portion that engages about one-fifth of the circumference of the rivet 5 and that the heads of the rivets 5 extend over the detent for confining the same in position. Another detent 8 having similar terminal loops 7 is confined between the stationary disk member 1 and the rivet 5 upon the opposite side of the plate 4, as shown in Fig. 3. The two detents 8 comprise friction producing means when in engagement with disk members 1 and 2.

The two members 1 and 2 are provided with right angled attaching flanges 1ª and 2ª by means of which the same may be attached to the relatively hinged parts.

Where considerable jar is encountered, for example in a windshield structure, it is desirable to provide the removable hinge member 2 with suitable recesses such as 6 for engaging the spring detents 8. However, in ordinary windows in houses and the like where little shock and jar occurs, the movable hinged member may be made with a smooth periphery as shown in Figure 6.

In Figure 7, there is shown a modified structure. In this instance, the plate 4ª, corresponding to the plate 4, is provided with a slot 9 below the pivot 3 which is provided with a roll 11 upon its shank for forming an abutment for a leaf spring 12 positioned between the roll and the bottom of the groove. The top of the plate 4ª is transversely split and the metal 4ᵇ on one side of the split is crimped over the stationary member 1 of the hinge while the metal 4ᶜ on the other side of the split is crimped over the movable member 2ᶜ of the hinge. It will be obvious that the crimped portions of the plate 4ª will be held in frictional engagement with the peripheries of the hinge members by the spring 12 which, however, will yield sufficiently to allow rotative movement of the hinge members.

It will be noted that in its operative position the stationary member 1 of the hinge is secured to the window frame and the movable portion 2 of the hinge is connected to the window as indicated in Figure 1. Of course, it will be understood that each window will have a pair of such hinges arranged upon the opposite sides thereof and in order to open the window it is merely necessary to rotate the same upon the pivot 3, the detents 8 or the plate 4ª yielding for such a purpose. When the window has been opened or closed to the desired extent the yielding detents or crimped portions 4ᶜ and 4ᵇ of the plate 4ª will engage the periphery of the movable hinge member and retain the same in adjusted position. In cases where the notches such as 6 are used in the periphery of the movable hinge member the detent will of course snap into such recesses for more securely holding the window in adjusted position.

I am aware that many changes may be made and numerous details of construction may be varied through a wide range without departing from the principles of this invention and I therefore do not purpose limiting the patent granted hereon otherwise than necessitated by the prior art.

I claim as my invention:

1. In a hinge, a stationary member, a plate pivoted to said stationary member, a stud carried by the upper portion of said plate, a swingable member coaxially pivoted with said plate, and a pair of resilient members engaged by said stud, one resilient member having yielding terminals in engagement with said stationary member and the other resilient member having yieldable terminals in contact with said movable member.

2. In a hinge, a pair of spaced relatively movable members, a plate positioned in the space between said members, a pair of resilient members connected to said plate outside of said space, said resilient members frictionally engaging said movable members for controlling the relative movement thereof.

3. In a hinge, a stationary support, a plate pivoted to said support, a movable member coaxial with said plate, a resilient member on said support having looped portions in engagement with said stationary member, and a second resilient member on said support having spaced loops in engagement with the periphery of said movable member, said movable member having notches for receiving the loops of said latter resilient member.

4. In a hinge, a pair of spaced relatively movable members, an intermediate member disposed between said members, a pivot element connected to said members, and friction producing means connected to said intermediate member for engaging the peripheries of said spaced members for controlling relative movement thereof.

5. In a hinge, a pair of spaced relatively movable members, an intermediate member, a pivot element connected to said members, said relatively movable members having notched peripheries, said intermediate member having an end extending beyond said peripheries, and resilient means connected to said end of the intermediate member for engaging said notched peripheries.

6. In a hinge, a pair of spaced relatively movable members, a support in the space between said members, and a pair of yieldable detents connected to said support outside of said space, each detent having two portions in contact with one of said members.

In testimony whereof I have hereunto subscribed my name.

GEORGE A. JACOBS.